Patented June 17, 1941

2,246,257

UNITED STATES PATENT OFFICE 2,246,257

SEPARATION OF ORGANIC MIXTURES

Gerhard Kohn, Amsterdam, Netherlands, assignor to Shell Development Company, San Francisco, Calif., a corporation of Delaware No Drawing. Application June 24, 1939, Serial No. 281,057. In the Netherlands July 2, 1938

8 Claims. (Cl. 196—13)

This invention relates to a method for separating mixtures of organic compounds by extraction with solvents having preferential solvent powers for a portion only of the components of the mixtures, and more particularly deals with the separation of hydrocarbon mixtures into fractions by extracting them with solvents in the presence of certain modifying agents which selectively modify the solvent power of the solvent for certain of the hydrocarbons.

It is a purpose of this invention to separate by solvent extraction mixtures of organic compounds into fractions according to their chemical relationship. Another purpose is to effect a separation of chemically closely related compounds, such as mixtures of isomers or other chemically very similar compounds having boiling points close to each other. It is a further purpose to utilize solvents in this extraction which normally are not considered selective and suitable for such separation.

There are many organic compounds, which by the ordinary standards of testing stability of solvents to be used in extraction processes, are quite stable and unreactive, yet many have secondary valences which enable them to "react" with a variety of other compounds, in particular inorganic salts and their acids, to form loose addition or complex compounds. The number of organic solvents possessing secondary valences is quite large, and a number of these solvents have proved to be substantially non-selective for mixtures of organic compounds, such as hydrocarbons which consist essentially of physically and chemically related components, because they are completely miscible therewith. Now I have found that if the secondary valences of such non-selective solvents are "saturated" by the addition of suitable salts or their acids, the solvent action of such solvents may be modified to become highly selective, thus making the modified solvents very suitable for fractionally extracting such mixtures of organic compounds.

The process of "saturation" of the secondary valences can be effected up to the maximum amount of compound that can be dissolved by the solvent.

However, in practice it is often not necessary to dissolve the maximum quantity in the solvent in question in order to make the process of the invention workable.

In some cases the solution will not become saturated with the compound added, but precipitation of a loose double compound occurs, which is, of course, a definite proof that the double compound existed in the solution. The nonoccurrence of a solid double compound does not, however, prove that the said compound did not exist in the solution.

I have also found that those solvents which already selectively dissolve certain components of the mixture of organic compounds can be improved by the addition of modifying agents. I have further found that also solvents with respect to which it is not easy to prove the existence of the saturation of secondary valences may often be suitably modified by the addition of such modifiers as are soluble. In this case, the action of the modifier may be said to be one of selectively salting out a portion of the mixture.

Solvents which have secondary valences and are most readily responsive to the addition of soluble modifier salts for modifying their solvent powers are particularly the oxy-hydrocarbons, especially aliphatic lower alcohols, ethers, aldehydes, ketones and carboxylic acids having less than about 10 carbon atoms. However, other solvents, such as oxygenated iso- and heterocyclic compounds, e. g., phenols, furfural, benzaldehyde, thiophenaldehyde, nitropyridine, diphenyl oxide, benzophenone, benzyl alcohol, etc.; or nitro hydrocarbons, e. g. nitro-methane, nitro-ethane, nitrobenzene, nitro toluene, etc., may be materially and beneficially modified by the addition of suitable modifier salts and acids.

As solvents to be modified use may as a rule be made of compounds that may be considered as being derived from the hydrides of the elements of the fifth and sixth periods, especially N, O, P and S, by substituting in these hydrides alkyl-, alkoxy alkyl-, aroxy alkyl-, aryl-, alkoxy aryl-, or oxy aryl, alkoxyl- or aroxyl groups for one or more hydrogen atoms.

Instead of salts, certain other modifiers may also be used. Modifier salts as herein used mean inorganic salts and their free acids, e. g. complex acids, such as $H_3Fe(CN)_6$, which are soluble in the solvent to be employed in the extraction and which do not chemically change the solvent except to form loose complex compounds. The modifier, whether it be a salt or not, in addition to being soluble in the solvent, must not oxidize, reduce, crack, polymerize, isomerize, or otherwise change the solvent by chemical reaction other than to effect a saturation of its secondary valences. Moreover, to effect a suitable fractionation of the mixture to be separated into its components, the modifier must not substantially react with any of the components of the mixture, nor effect a chemical change therein. In the following a list of modifiers is given which may or may not be suitable in combination with certain solvents, fractionally to extract certain mixtures in accordance with the above requirement for chemical inertness. Since, however, it is generally well known whether certain of the listed modifiers are likely to react chemically with given solvents and/or organic mixtures to be separated, one can readily select a suitable combination and avoid unsuitable ones. Among the modifier salts suitable in one combination or another are the following: hydrogen halides and halides of the polyvalent metals, i. e. metals of the first to eighth groups of the Periodic System, examples being hydrogen chloride, the chlorides, bromides and iodides of copper, silver, gold, magnesium, calcium, strontium, barium, zinc, cadmium, mercury, boron, aluminium; tin tetrachloride, antimony trichloride, bismuth trichloride, chromium trichloride, ferric chloride, vanadyl chloride, cobalt halides, nickel halides, etc.; corresponding nitrates, as far as they are reasonably stable; corresponding sulfates, although in general the latter are less desirable because of their limited solubilities in organic solvents; corresponding cyanides, sulfocyanides, ferro- and ferricyanides, etc.

The elements occurring in the right-hand columns of the above-mentioned groups as well as the iron group of the periodic system are well-known complex formers, especially when the ion charge of the central atom is high and their volume is small. In the present application combinations of these elements, especially of copper, tin and in some cases lead, antimony and sometimes arsenic, bismuth, selenium or tellurium are preferred. However, also aluminium, vanadium or chromium compounds in some cases are suitable. One may also use iron compounds and, if so desired, cobalt or nickel compounds.

Cupro compounds, for example, are soluble in the following nitrogen-containing substances: amines, pyridine, quinoline.

Cupri compounds are soluble in aliphatic alcohol with 1-5 carbon atoms, allyl alcohol, ketones such as acetone, esters such as ethyl formate, aliphatic or aromatic (cyclic) amines, such as pyridine, piperidine, aniline, aromatic nitriles and thio ethers.

Boron halides are soluble in ethers and aliphatic nitriles with 2 or 3 carbons atoms.

Aluminium halides, such as $AlCl_3$, may be used. In some cases, even when fully converted into a double compound, aluminium chloride remains chemically active and is thus not suitable. It is, however, soluble in alcohols, ketones, acid chlorides, such as benzoyl chloride, ethers, amines, such as ethyl amine, aromatic nitrocompounds, such as nitrobenzene and sulfones.

The tin compounds, such as $SnCl_4$, are soluble in alcohols, phenols, in aliphatic as well as aromatic ketones, acid chlorides, ethers, esters, such as ethyl acetate, benzonitrile, amides, such as $C_6H_5CONH_2$. Some of these compounds, such as alcohols, ketones, ethers and esters, such as the lower acetates, also dissolve $SnCl_2$.

Vanadyl chloride, $VOCl_3$, just like chromyl chloride, forms a double compound with ethers.

$AsCl_3$ dissolves in alcohols, ketones, organic acids, ethers, esters, quinoline, aniline, etc.

The trivalent antimony compounds, which are the preferred compounds of the fifth group, such as $SbCl_3$, dissolve in alcohols, phenols, benzaldehyde, ketones, such as acetone, in ethers such as methylal, diethyl ether or anisol, in esters, such as ethyl acetate, in amines, such as methyl amine or aniline, in nitriles, such as benzonitrile, in nitro compounds, such as nitrobenzene, and in aromatic halides, such as monochlor benzene.

On the other hand bismuth halides, such as $BiCl_3$, are soluble in alcohols, ketones, ether, methylal, methyl acetate, ethyl acetate, pyridine, quinoline and other nitrogen bases.

Examples of substances forming double compounds are further cupric chloride, bromide or iodide and di-n. butyl sulfide; cuprous iodide and di-n. butyl selenide; nickel oleate and tripropyl phosphite, cobalt iodide and dioxane, cadmium butyrate and trimethyl amine, stannic chloride and diethyl ether, antimony trichloride and butyl mercaptan or a sulfone, such as dibutyl sulfone, furfural with $SnCl_4$, $H_3Fe(CN)_6$ or $H_4Fe(CN)_6$. The preparations of some of these compounds have already been mentioned in U. S. patent specification No. 2,150,349.

Instead of using salts or their free acids to modify the solvent power of solvents capable of dissolving them, it is also possible to effect a similar modification with water or water-soluble alcohols, particularly polyvalent water-soluble alcohols, such as glycol, glycerine, sugars, etc. However, in general I prefer inorganic salts, as they appear to increase the selectivity of the solvents to a greater extent.

In carrying out my process, I may merely extract the mixture to be separated in one or several stages, continuously or in batches, by means of one or several suitable solvents containing a modifier as explained above. Or I may carry out the extraction in stages with a solvent which contains progressively larger amounts of modifiers, as by adding modifier to the solvent in the several stages; or conversely in a counter-current flow system I may dilute the modifier in the solvent by adding more solvent to the solution of modifier as it flows through the system against the mixture to be separated. Further, I may completely dissolve the mixture in one of the solvents substantially in the absence of modifier, and thereafter, by adding more and more of the modifier, I may precipitate separate fractions of the mixture, which fractions may be withdrawn individually. Another method for fractionating may comprise the use of varying amounts of solvents. For example, a mixture may first be extracted with a large volume of a modified solvent and the resulting extract may be extracted with progressively smaller amounts of the same or a more deeply modified solvent, e. g. by removing (distilling) some of the solvent from the primary extract solution; or conversely, I may begin with a small volume of solvent and re-extract the extraction residue (raffinate) with progressively larger volumes which, if desired, may contain progressively more modifier. If desired, combinations of two or more of the above methods may be employed. Moreover, in order to effect a separation in the order of increasing molecular weights of homologous compounds, I may extract a mixture of such homologous compounds with a series of homologous solvents of increasing molecular weights, such as, for example, the series methyl, ethyl, propyl, butyl, amyl, hexyl, benzyl alcohols; or $C_4$, $C_5$, $C_6$, $C_7$, $C_8$, etc. ethers; or $C_3$, $C_4$, $C_5$, $C_6$, $C_7$, $C_8$, etc., ketones. Moreover, certain alcohols, ketones, or ethers may be substituted for each other. For example, the following pairs are substantially equivalent with regard to their solvent powers for hydrocarbon mixtures:

Ethyl or propyl alcohols and acetone; isobutyl alcohol and methyl ethyl ketone; amyl alcohol or aromatic alcohols and diethyl ether.

Moreover, solvents of regularly widely different solvent powers can be modified so that they may acquire substantially equal solvent powers, for example, for hydrocarbon oils, by adding to the stronger solvent a greater amount of the modifier.

Countercurrent extraction with two solvents substantially immiscible with each other, at least one of which contains substantial amounts of a modifier, may be useful. This may be so particularly in cases in which one portion of the mixture to be separated has a tendency to form complex compounds with the modifier greater than the remaining portion, the complex so formed being soluble in the solvent containing the modifier, while the remaining portion of the mixture is preferentially soluble in the other solvent.

The temperature of the extraction is normally kept as low as is practicable in order to avoid chemical reaction between the salt and/or the mixture to be separated. In general, normal room temperatures are quite suitable for the extraction. Occasionally, temperatures below normal room temperature may be preferable, particularly when employing highly reactive modifiers, such as the chlorides of iron, aluminium, etc., whereas in other cases higher temperatures, e. g. up to 60° C., are required. This is especially the case under those circumstances where a fractionation by a stepwise decrease in temperature is desired.

As hereinbefore indicated, among the mixtures to be separated with the aid of my modified solvents are hydrocarbon mixtures. These include gasoline distillates, kerosene, gasoil, lubricating oils or mixtures of these products, high molecular weight polymers, such as poly-isobutylenes, etc.; mixtures of benzene, toluene and xylenes; or mixtures of isomeric compounds, as meta-xylene and para-xylene. By selecting the proper solvent and modifier, the separation may be so conducted as to segregate normally solid from normally liquid components. Thus waxy hydrocarbon oils may be dewaxed. Other mixtures capable of separation by my process are fats and fatty oils, fatty acids, fatty alcohols, essential oils, naphthenic acids, alkyl phenols, petroleum bases, and many other organic mixtures obtained in industrial processes. The mixtures to be separated may be gaseous, liquid or solid, for example, the process may be used for the separation of mixtures of paraffin waxes, such as beeswax, japan wax, montan wax, candelilla wax; or artificial waxes, such as highly chlorinated naphthalenes; or other solid organic mixtures, such as camphors, etc. In the treatment of gaseous mixtures, olefines may, for instance, be separated from paraffin hydrocarbons.

Regeneration of the solvent may in most cases be accomplished by distillation. Depending upon the nature of the modifier, the latter may be taken overhead, together with the solvent, as in the case of HCl, water, etc.; or it may remain in admixture with the extract fraction from which it may be separated as a precipitate or sludge; or by washing with water, if the modifier is water-soluble; or by extraction with a suitable base, if the modifier is an acid. If a fraction is concerned in which the solvent used has been selectively modified only partially by addition of an inorganic compound (but which is separated off completely in the treatment with the completely modified solvent), the solvent is as yet completely modified, whereupon the regeneration of the solvent may be carried out by distillation. If desired, the modifier may be changed chemically before attempting to distill the solvent, because some modifiers, such as aluminium chloride, may cause considerable undesirable reactions in the extract or solvent or both at the elevated temperatures of distillation. Such an undesirable effect may be avoided, for example, by the addition of water to the aluminium chloride, caustic alkali to hydrogen chlorides, etc. In other cases, it may be sufficient to employ vacuum distillation, thereby lowering the distillation temperatures sufficiently to avoid chemical changes which may be undesirable.

The mixture to be separated by my process may be pre-treated, if desired, in any conventional manner. Thus my treatment may be preceded by caustic alkali or acid treatment or by a conventional selective solvent extraction.

For the further illustration of my invention, a number of specific combinations of solvents and modifier are given in the list below. In this list is also indicated the type of mixture and the nature of separation for which these combinations have been found to be particularly useful.

Solvent: Isoamyl alcohol
Modifier: HCl
Separation between: Viscous hydrocarbon lubricating oil and lower homologues Solvent: Isobutyl alcohol
Modifier: HCl
Separation between: Viscous hydrocarbon lubricating oil and lower homologues Iso-amyl alcohol and isobutyl alcohol respectively were saturated with HCl in the ratio 1 alcohol: 1 HCl. One part by vol. of the addition compound was mixed with 2 parts by vol. of:

(a) Lubricating oil SAE 50, or
(b) Kerosene, or
(c) Gasoline with the following result:

The lubricating oil was quantitatively separated off, whilst the kerosene and the gasoline remained partially dissolved, of the gasoline about 4 times as much as of the kerosene.

Solvent: Isoamyl alcohol
Modifier: $MgCl_2$
Separation between: Hydrocarbon lubricating oil and lower homologues 1 part by vol. of iso-amyl alcohol was saturated with $MgCl_2$. It was mixed with 1 part by vol. of:

(a) Paraffinum liquidum, or
(b) Kerosene, or
(c) Gasoline.

The results were:

(a) Quantitatively separated off
(b) and (c) remained in homogeneous solution with the alcohol.

Solvent: Diethyl ether
Modifier: HCl
Separation between: Hydrocarbon lubricating oil and wax Solvent: Diethyl ether
Modifier: $ZnI_2$
Separation between: Hydrocarbon lubricating oil and lower homologues Diethyl ether was saturated with $ZnI_2$ (base solution). 3 parts by vol. of the base solution and 2 parts by vol. diethyl ether were mixed with 2 parts by vol. of:

(a) Lubricating oil SAE 50, or
(b) Kerosene, or
(c) Gasoline.

The results were:
40% of (a) were separated off, whilst (b) and (c) remained dissolved.

Solvent: Methyl ethyl ketone
Modifier: $ZnCl_2$
Separation between: Hydrocarbon lubricating oil and kerosene and/or gasoline Methyl ethyl ketone saturated with $ZnCl_2$ was used as base solution. 2 parts by volume base solution and 3 parts by volume methyl ethyl ketone were mixed with 2 parts by volume of:

(a) Gasoline, or
(b) Kerosene, or
(c) Lubricating oil, SAE 50.

The results were:

(a) Remained dissolved
(b) and (c) were separated off quantitatively in the upper phase.

2 parts by volume of the base solution and 4½ parts by volume of methyl ethyl ketone were mixed with 2 parts by volume of:
(a) Gasoline, or
(b) Kerosene, or
(c) Lubricating oil SAE 50.

The results were:

(a) and (b) remained dissolved.

1.87 parts by volume of lubricating oil (c) (=93.5% by volume of the original oil) were separated off in the upper phase together with 0.33 part by volume ketone.

Solvent: Diethyl ether
Modifier: $AlCl_3$ or $SbCl_3$
Separation between: Hydrocarbon lubricating oil and kerosene and/or gasoline 6.4 parts by weight $SbCl_3$ were dissolved in 5 parts by volume diethyl ether (base solution). 2 parts by volume of the base solution and one-half part by volume ether were mixed with 2 parts by volume of:

(a) Gasoline, or
(b) Kerosene, or
(c) Lubricating oil SAE 50.

The results were:

(a) Remained dissolved,
15% of (b) separated off in the upper phase,
85% of (c) separated off in the upper phase (simultaneously with ether).

Solvent: Acetone
Modifier: $ZnCl_2$
Separation between: Kerosene and gasoline

Acetone was saturated with $ZnCl_2$ (base solution). 2.5 parts by volume of the base solution and 5.7 parts by volume acetone were mixed with 2 parts by volume of:

(a) Kerosene, or
(b) Gasoline.

The results were:

75% of (a) separated off,
(b) Remained dissolved.

Solvent: Isoamyl alcohol
Modifier: Saturated with $H_2O$
Separation between: Viscous hydrocarbon lubricating oil and lower homologues Solvent: Isobutyl alcohol
Modifier: Saturated with $H_2O$
Separation between: Hydrocarbon lubricating oil and lower homologues A mixture of 1 part by volume of lubricating oil SAE 50 and 1 part by volume of kerosene was separated quantitatively with the aid of isobutyl alcohol saturated with water. To this end it had to be washed three times with 2 parts by volume of the butyl alcohol saturated with water.

Solvent: Methyl ethyl ketone
Modifier: Saturated with $H_2O$
Separation between: Hydrocarbon lubricating oil and lower homologues 4 parts by volume of methyl ethyl ketone and 4 parts by volume of:

(a) Kerosene, or
(b) Lubricating oil SAE 50 were mixed with $H_2O$ in an amount greater than necessary for saturation.

The results were as follows:

The kerosene remained dissolved, whereas in case (b) there were obtained a lower layer consisting of 2.2 parts by volume ketone saturated with $H_2O$, an intermediate layer consisting of 5.5 parts by volume of lubricating oil and ketone, and an upper layer consisting of 2.5 parts by volume of ketone saturated with water.

Solvent: Isopropyl alcohol
Modifier: Small amount of $H_2O$
Separation between: Kerosene and gasoline (a) In a liquid consisting of 3 parts by volume isopropyl alcohol and 3 parts by volume of gasoline 0.45 part $H_2O$ was taken up without separation.
(b) In a liquid consisting of 3 parts by volume isopropyl alcohol and 3 parts by volume kerosene 0.15 part $H_2O$ was taken up without separation. A further addition of 0.1 part of $H_2O$ brought about separation. The lower layer then contained 30% of the kerosene and the upper layer 70% of the kerosene. On addition of a quantity of $H_2O$ as in b, 70% kerosene was separated off, whilst gasoline remained dissolved.

Solvent: Ethyl alcohol
Modifier: Small amount of $H_2O$
Separation between: Kerosene and gasoline An analogous effect as described with isopropyl alcohol was obtained with ethyl alcohol, even on addition of 3% $H_2O$ calculated on the alcohol.

Solvent: Methyl alcohol
Modifier: $ZnCl_2$
Separation between: Xylene and toluene benzene 4.3 parts by weight of $ZnCl_2$ and 5 parts by volume of $CH_3OH=6.1$ parts by volume in total were used as base solution.

I: 1 part by volume of the base solution and 1½ part by volume of $CH_3OH$ were mixed with 2 parts by volume of:

(a) Benzene, or
(b) Toluene, or
(c) Xylene.

The results were as follows:

(a) Remained dissolved,
0.6 part by volume of (b) was separated off
1.6 parts by volume of (c) was separated off II: On addition of 0.5 part by volume $CH_3OH$, (b) was likewise quantitatively dissolved, whilst in the case of (c) still 1.2 parts by volume remained undissolved.

Solvent: Methyl alcohol
Modifier: HCl
Separation between: Xylene and toluene benzene Solvent: Ethyl alcohol
Modifier: HCl
Separation between: Xylene and toluene benzene The same results as obtained with $ZnCl_2$ were obtained when methyl alcohol or ethyl alcohol, saturated with HCl, was used.

Solvent: Methyl and ethyl alcohols
Modifier: $ZnCl_2$
Separation between: p-Xylene and m-xylene This example demonstrates the selective effect of the process to a remarkable extent. In fact, it is known that the isomeric xylenes, on account of their boiling points being almost identical, cannot be separated at all by fractional distillation (by fractional crystallisation only with great difficulty, compare German Patent No. 567,331).

As a rule one is confined to the destruction by oxidation of the p- and o-isomers in order to obtain m-xylene, or by making first the sulfonic acids and then separating these acids, thus by a circuitous method.

5.2 parts by volume of a solution of 27% by weight $ZnCl_2$ in 76.3% by volume $CH_3OH$ and 23.7% by volume $C_2H_5OH$ were shaken with 2 parts by volume of:

(a) Common pure xylene
(b) p-Xylene (purissimum).

The results were as follows:

35% of (a) was separated off,
(b) remained dissolved.

EXAMPLES

1. Extractions of dewaxed La Concepcion distillate

The Concepcion distillate was extracted with a solution of anhydrous zinc chloride in butanone. The extractions were invariably carried out at the same temperature and with the same quantity of solvent. Only the amount of $ZnCl_2.O$ aq. in the solvent was varied in order to obtain different raffinate yields. For comparison extractions were effected with butanone-water. The results of these experiments are given in Table I

TABLE I

Extractions of dewaxed La Concepcion distillate

| | | Experiment No. | | | |
|---|---|---|---|---|---|
| | | 1 | 2 | 3 | 4 |
| Quantity of solvent in per cent by volume on initial material | | Butanone=240 Base sol.=60 30 | Butanone=200 Base sol.=100 30 | Butanone=150 Base sol.=150 30 | Butanone=280 Water=20 30 |
| Extraction temperature* | | | | | |
| Yield: | Initial material dewaxed La Concepcion distillate. | | | | |
| Extract, per cent by volume— | | | | | |
| Measured | | 30.5 | 17.5 | 10.4 | 25.0 |
| Calc. from d 25/4 | | 30.6 | 18.0 | 9.8 | 25.2 |
| Raffinate, per cent by volume: | | | | | |
| Measured | | 69.5 | 82.5 | 89.6 | 75.0 |
| Calc. from d 25/4 | | 69.4 | 82.0 | 90.2 | 74.8 |
| Properties: | | Extr. Raff. | Extr. Raff. | Extr. Raff. | Extr. Raff. |
| d 25/4 | 0.9088 | 0.9494 0.8909 | 0.9784 0.8935 | 1.0124 0.8975 | 0.9464 0.8961 |
| $n_D^{20}$ | 1.5090 | ------ 1.4968 | ------ 1.4971 | ------ 1.4998 | ------ 1.4996 |
| $V_k 100°$ F | 155.8 | ------ 114.3 | ------ 106.5 | ------ 112.6 | ------ 133.8 |
| $V_k 210°$ F | 12.16 | ------ 11.21 | ------ 10.57 | ------ 10.62 | ------ 11.48 |
| V. I. | 63 | ------ 89 | ------ 86 | ------ 79 | ------ 74 |

*Base solution=solution of $ZnCl_2O$ aq. in butanone saturated at about 20° C. This solution contained about 1 g. $ZnCl_2.O$ aq. per cm.³ butanone.

The phases obtained in experiments 1, 2 and 3 were worked up as follows. The extract phase diluted with pentane was washed out with water to remove $ZnCl_2$, whereupon pentane was distilled off with some butanone and water. The raffinate phase contained only little butanone+ $ZnCl_2.O$ aq., so that in this case the butanone was distilled off directly, whereupon the raffinate was filtered off from $ZnCl_2.O$ aq. In view of the small amount of $ZnCl_2.O$ aq. present in the raffinate phase there is no appreciable risk of deterioration of the raffinate during the distillation of the butanone. The practically identical values found for the yields measured and those calculated from the densities prove the soundness of this argument.

Conclusion

The raffinate yield being equal, the product obtained with butanone+$ZnCl_2.O$ aq. is much better than that produced with butanone+water, with respect to V. I., density and refractory index.

One may also improve a selective solvent which is already good, but has too great a solubility in the hydrocarbon mixture to be treated, by dissolving a salt therein. Examples of such solvents are, for example, nitro benzene, cresol or pyridine, which are greatly soluble in the lighter fractions. Several salts, such as $ZnCl_2.O$ aq., $MgCl_2.O$ aq., $SnCl_4.O$ aq., $Cu_2Cl_2$ and $CuCl_2.O$ aq., all appeared to be little soluble in cresol at room temperature.

When $SnCl_4.O$ aq. is added to cresol, a solid compound is formed which is little soluble in the excess cresol.

The points of demiscibility of cresol, saturated at room temperature with some salts, with dewaxed La Concepcion distillate were determined, viz. in the volume ratio 1 part of distillate to 3 parts of solvent.

| Solvent used | Point of demiscibility with Concepcion distillate |
|---|---|
| | °C. |
| Cresol | 41 |
| Cresol satur. with $ZnCl_2.O$ aq | 60 |
| Cresol satur with $Cu_2Cl_2$ | <50 |
| Cresol satur. with $CuCl_2.O$ aq | About 43 |
| Cresol satur. with comp. of cresol and $SnCl_4.O$ aq | 65 |

Although the solubility of the salts in the solvent was only slight, their effect on the points of demiscibility was quite appreciable.

$SbCl_3$ (2:3 parts by weight). The initial material used for the experiment with nitrobenzene+$AlCl_3.O$ aq. had the following properties: $d\ 20/4=0.7810$, $n_D^{20}=1.4376$, percent by volume sulfonatable constituents=30, and that used for the experiment with cresol-$SbCl_3$ had the following properties: $d\ 20/4=0.7771$, $n_D^{20}=1.4382$, percent by volume sulfonatable contituents= 33.5.

For the results of the experiments reference is made to Table III.

TABLE III

*Extractions of the fraction 100–170° C. from dehydrogenated Lagunillas gasoline*

| | Nitrobenzene sat. with $AlCl_3.O$ aq. at 10 °C.=100. | Cresol+$SbCl_4$=100 |
|---|---|---|
| Quantity of solvent in percent by volume on initial material. | | |
| Extraction temp., °C | 10 | 15 |
| Yield: | | |
| Extract, percent by vol | 38 | 64 |
| Raffinate, percent by vol | 62 | 36 |
| Properties: | Extr. Raff. | Extr. Raff. |
| $d\ 20/4$ | 0.7925  0.7630 | 0.7889  0.7537 |
| $n_D^{20}$ | 1.4456  1.4257 | 1.4468  1.4237 |
| Percent by volume | | |
| Sulfonatable | | |
| Constituents | 52  16.5 | 42.5  16.5 |

In the experiment with nitrobenzene+$AlCl_3.O$ aq. the liquid layers were poured out on ice and washed with dilute hydrochloric acid and water to remove the $AlCl_3$, whereupon the mixture was dried on $CaCl_2.O$ aq. The gasoline was subsequently distilled off.

It is not possible to distill off the gasoline directly from the liquid layers under atmospheric pressure without first removing the $AlCl_3$, since in that case a violent reaction occurs (at about 100° C.) under formation of tar-like products.

When use is made of the solvent cresol-$SbCl_3$,

TABLE II

*Extractions of dewaxed La Concepcion distillate*

| | | Experiment No. | | |
|---|---|---|---|---|
| | | 1 | 2 | 3 |
| Quantity of solvent in percent by volume on initial material | | Technical cresol=100 | Technical cresol=100 | Technical cresol satur. with $ZnCl_2.$ Oaq.=100 |
| Extr. temperature, °C | | 0 | About 20 | About 20 |
| Yield: | Initial material dewaxed La Concepcion distillate | | | |
| Extract percent by volume— | | | | |
| Measured | | 24.5 | 31 | 26 |
| Calculated from $d\ 25/4$ | | 22.5 | 29 | 23 |
| Raffinate percent by volume: | | | | |
| Measured | | 75.5 | 69 | 74 |
| Calculated from $d\ 25/4$ | | 77.5 | 71 | 77 |
| Properties: | | Ext. Raff. | Ext. Raff. | Extr. Raff. |
| $d\ 25/4$ | 0.9088 | 0.9666  0.8922 | 0.9480  0.8927 | 0.9674  0.8914 |
| $n_D^{20}$ | 1.5090 | ——  1.4985 | ——  1.4980 | ——  1.4980 |
| $V_s\ 100°\ F$ | 155.8 | ——  118.3 | ——  118.8 | ——  144.7 |
| $V_s\ 210°\ F$ | 12.16 | ——  11.15 | ——  11.20 | ——  10.67 |
| V. I. | 63 | ——  83 | ——  84 | ——  77 |
| Colour union | | ——  78 | ——  78 | ——  *78 |

*Colour a little lighter than in Experiments 1 and 2.

In Experiment 3, after dilution with an aromatic-free gasoline fraction 60/80, the phases were washed with water to remove the $ZnCl_2$. The gasoline 60/80 and the cresol were subsequently distilled off at 10 mm. mercury (maximum bath temperature=170° C.).

Cresol-$ZnCl_2.O$ aq. is better than cresol alone as far as density, refractory index and colour are concerned.

*2. Extractions of the fraction 100–170° C. from dehydrogenated Lagunillas gasoline*

The extractions were carried out with a solution of $AlCl_3.O$ aq. in nitrobenzene saturated at 10° C. (this was the extraction temperature), which solution contained about 12% by weight $AlCl_3.O$ aq., and with a mixture of cresol and it is possible to distill off the gasoline directly from the solvent under atmospheric pressure without any risk of deterioration.

*3. Example relating to the separability of benzene and toluene, and of benzene and xylene by means of the solvent methanol-$ZnCl_2.O$ aq.*

All the extractions were carried out with an equal quantity of solvent and at the same temperature. Only the quantity of $ZnCl_2.O$ aq. in the solvent was varied with a view to obtaining different yields of raffinate. Moreover, an extraction with methanol-water was made for comparison.

The results of these experiments are shown in Table IV.

TABLE IV

| Initial material | Solvent in percent by volume calculated on initial material | Extraction temp., °C. | Yield percent by vol. | | Composition percent by vol. | |
|---|---|---|---|---|---|---|
| | | | Extract | Raffinate | Extract | Raffinate |
| Benzene-toluene (1:1 parts by vol.) | Methanol saturated with ZnCl$_2$.O aq.=100 | About 20 | 12.2 | 87.8 | b:62.3 t:37.7 | b:47.4 t:52.6 |
| Do | {Base solution*=90 Methanol=10} | About 20 | 19.4 | 80.6 | b:55.7 t:44.3 | b:49.0 t:51.0 |
| Do | {Base solution*=70 Methanol=30} | About 20 | 21.0 | 79.0 | b:64.8 t:35.2 | b:45.3 t:54.7 |
| Benzene-xylene (1:1 parts by vol.) | {Base solution*=50 Methanol=50} | About 20 | 36.1 | 63.9 | b:56.5 x:43.5 | b:45.0 x:55.0 |
| Do | {Water=20 Methanol=80} | About 20 | 12.2 | 87.8 | b:65.6 x:34.4 | b:48.0 x:52.0 |

*Base solution=solution of ZnCl$_2$.O aq. in methanol containing 1 g. ZnCl$_2$.O aq. per cm.$^3$ methanol.

From the last two columns one can see that benzene concentrates in the extract and toluene or xylene in the raffinate layer.

The solvent was invariably removed from the phases by washing with water. Compositions of extract and raffinate were determined by rectification.

From the above figures it follows that the light-heavy selectivity of methanol-water is slightly inferior to that of methanol-ZnCl$_2$.O aq., i. e. that methanol-water less readily separates aromatics of varying molecular weights.

I claim as my invention:

1. In a process for separating a mixture of organic compounds, the steps comprising extracting said mixture with an oxy-hydrocarbon solvent containing less than 10 carbon atoms at least a portion of which is in loose chemical combination with a salt of a metal selected from the right hand column of the IV, V and VI groups of the periodic system, said salt being stable under the conditions of the extraction, under conditions to form two layers, one being a liquid solvent layer containing at least a major portion of said salt in substantially unaltered condition and a portion only of said mixture, and the other comprising a residual portion of said mixture undissolved in said solvent and separating said layers, said mixture being chemically substantially inert to said salt under the conditions of the extraction.

2. The process of claim 1, wherein said salt is a halide salt.

3. The process of claim 1, wherein said mixture is a hydrocarbon mixture.

4. The process of claim 1, wherein said oxy-hydrocarbon is a monohydric alcohol.

5. In a process for separating a mixture of organic compounds, the steps comprising extracting said mixture with an oxy-hydrocarbon solvent containing less than 10 carbon atoms at least a portion of which is in loose chemical combination with antimony trichloride dissolved in said solvent under conditions to form two layers, one being a liquid solvent layer containing at least a major portion of antimony trichloride in substantially unaltered condition and a portion only of said mixture, and the other comprising a residual portion of said mixture undissolved in said solvent and separating said layers, said mixture being chemically substantially inert to antimony trichloride under the conditions of the extraction.

6. In a process for separating a mixture of hydrocarbons, the steps comprising extracting said mixture with an oxy-hydrocarbon solvent containing less than 10 carbon atoms at least a portion of which is in loose chemical combination with antimony trichloride dissolved in said solvent under conditions to form two layers, one being a liquid solvent layer containing at least a major portion of antimony trichloride in substantially unaltered condition and a portion only of said mixture, and the other comprising a residual portion of said mixture undissolved in said solvent and separating said layers, said mixture being chemically substantially inert to antimony trichloride under the conditions of the extraction.

7. In a process for separating a mixture of hydrocarbons, the steps comprising extracting said mixture with an aliphatic monohydric alcohol containing less than 10 carbon atoms at least a portion of which is in loose chemical combination with antimony trichloride dissolved in said alcohol under conditions to form two layers, one being a liquid alcohol layer containing at least a major portion of antimony trichloride in substantially unaltered condition and a portion only of said mixture, and the other comprising a residual portion of said mixture undissolved in said alcohol and separating said layers, said mixture being chemically substantially inert to the antimony trichloride under the conditions of the extraction.

8. In a process for separating a mixture of hydrocarbons, the steps comprising extracting said mixture with a propyl alcohol at least a portion of which is in loose chemical combination with antimony trichloride dissolved in said alcohol under conditions to form two layers, one being a liquid alcohol layer containing at least a major portion of antimony trichloride in substantially unaltered condition and a portion only of said mixture, and the other comprising a residual portion of said mixture undissolved in said alcohol and separating said layers, said mixture being chemically substantially inert to the antimony trichloride under the conditions of the extraction.

GERHARD KOHN.